United States Patent
Kuo et al.

(10) Patent No.: US 12,127,212 B2
(45) Date of Patent: Oct. 22, 2024

(54) APPARATUS, METHOD AND COMPUTER PROGRAM FOR COMMUNICATION USING CONFIGURED GRANTS

(71) Applicant: Nokia Technologies Oy, Espoo (FI)

(72) Inventors: Ping-Heng Kuo, Bristol (GB); Dawid Koziol, Glogow (PL); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 333 days.

(21) Appl. No.: 17/430,351

(22) PCT Filed: Feb. 14, 2019

(86) PCT No.: PCT/CN2019/075131
§ 371 (c)(1),
(2) Date: Aug. 12, 2021

(87) PCT Pub. No.: WO2020/164081
PCT Pub. Date: Aug. 20, 2020

(65) Prior Publication Data
US 2022/0132557 A1 Apr. 28, 2022

(51) Int. Cl.
*H04W 72/23* (2023.01)
*H04W 28/06* (2009.01)

(52) U.S. Cl.
CPC ........... *H04W 72/23* (2023.01); *H04W 28/06* (2013.01)

(58) Field of Classification Search
CPC .............. H04W 72/23; H04W 28/06; H04L 2001/0096; H04L 1/0003; H04L 1/0009; H04L 1/08; H04L 1/1896; H04L 1/1887
See application file for complete search history.

(56) References Cited

U.S. PATENT DOCUMENTS

| | | | |
|---|---|---|---|
| 9,439,233 | B2 | 9/2016 | Kwon |
| 2012/0057560 | A1 | 3/2012 | Park et al. |
| 2017/0289995 | A1* | 10/2017 | Lin ........................ H04W 72/23 |

(Continued)

FOREIGN PATENT DOCUMENTS

| CA | 3 067 472 A1 | 12/2018 |
|---|---|---|
| CN | 101483532 A | 7/2009 |

(Continued)

OTHER PUBLICATIONS

"Packet Duplication for URLLC in 5G: Architectural Enhancements and Performance Analysis"; Rao et al.; IEEE Network Year: 2018 | vol. 32, Issue: 2 (Year: 2018).*

(Continued)

*Primary Examiner* — Benjamin H Elliott, IV
(74) *Attorney, Agent, or Firm* — Lippes Mathias LLP

(57) ABSTRACT

An apparatus comprising circuitry for performing: receiving a configuration message from a base station, wherein the configuration message includes instructions to use at least one first path for uplink transmission of a first group of data packets, and to use at least one configured grant in at least one second path for uplink transmission of duplicate packets of the first group of data packets; and in response to determining that at least one event has occurred, modifying at least one condition of the at least one configured grant for the uplink transmission of the duplicated packets.

12 Claims, 11 Drawing Sheets

(56) References Cited

U.S. PATENT DOCUMENTS

| | | | |
|---|---|---|---|
| 2018/0279327 A1 | 9/2018 | Ying et al. | |
| 2018/0324642 A1 | 11/2018 | Yu et al. | 28/65 |
| 2018/0332501 A1* | 11/2018 | Tseng | H04L 1/08 |
| 2018/0368107 A1* | 12/2018 | Babaei | H04W 76/00 |
| 2018/0368132 A1* | 12/2018 | Babaei | H04W 76/11 |
| 2018/0368200 A1 | 12/2018 | Jin et al. | |
| 2019/0037532 A1 | 1/2019 | Baghel | |
| 2020/0112879 A1* | 4/2020 | Shimoda | H04L 1/08 |
| 2020/0314805 A1* | 10/2020 | Tseng | H04L 1/16 |
| 2020/0389930 A1* | 12/2020 | Park | H04W 76/15 |
| 2021/0345424 A1* | 11/2021 | Cirik | H04W 72/23 |
| 2022/0132557 A1* | 4/2022 | Kuo | H04L 1/0009 |
| 2022/0264556 A1* | 8/2022 | Babaei | H04W 80/02 |

FOREIGN PATENT DOCUMENTS

| | | |
|---|---|---|
| CN | 108282823 A | 7/2018 |
| CN | 108401484 A | 8/2018 |
| EP | 3 618 485 A1 | 3/2020 |
| WO | 2018/230849 A1 | 12/2018 |
| WO | WO 2018/231425 A1 | 12/2018 |
| WO | WO 2018/233683 A1 | 12/2018 |
| WO | WO-2018228283 A1 | 12/2018 |
| WO | WO-2018/198963 A1 | 3/2020 |
| WO | 2020/088771 A1 | 5/2020 |
| WO | 2020/144403 A1 | 7/2020 |

OTHER PUBLICATIONS

R2-1801267, "Discussion on Uplink Packet Duplication", Institute for information Industry (III), 3GPP TSG-RAN WG2 NR Ad hoc 1801, Jan. 2018, 3 pages.

R2-180679, "Detailed behavior for PDCP packet duplication", Lenovo, Motorola Mobility, 3GPP TSG-RAN WG2 NR Adhoc #1, Jan. 2018, 4 pages.

R2-1802298, "PDCP duplication impacts for Mac", LG Electronics Inc., 3GPP TSG-RAN2 Meeting #101, Mar. 2017, 6 pages.

"3rd Generation Partnership Project; Technical Specification Group Radio Access Network; NR; Medium Access Control (MAC) protocol specification (Release 15)", 3GPP TS 38.321, V15.4.0, Dec. 2018, pp. 1-77.

Aljaz et al., "Packet Duplication in Dual Connectivity Enabled 5G Wireless Networks: Overview and Challenges", arXiv, Apr. 3, 2018, pp. 1-8.

"LTE; Evolved Universal Terrestrial Radio Access (E-UTRA) and Evolved Universal Terrestrial Radio Access Network (E-UTRAN); Overall description; Stage 2 (3GPP TS 36.300 version 13.8.0 Release 13)", ETSI TS 136 300, V13.8.0, Jul. 2017, 330 pages.

"Enhancements for Uplink PDCP Duplication", 3GPP TSG-RAN WG2 Meeting #105, R2-1901353, Agenda item: 11.7.4, Nokia, Feb. 25-Mar. 1, 2019, 3 pages.

Office Action received for corresponding Chinese Patent Application No. 201980092140.7, dated Mar. 29, 2024, 9 pages of Office Action and no page of translation available.

* cited by examiner

230

| $D_7$ | $D_6$ | $D_5$ | $D_4$ | $D_3$ | $D_2$ | $D_1$ | $D_0$ |

Fig. 2

APPARATUS, METHOD AND COMPUTER PROGRAM FOR COMMUNICATION USING CONFIGURED GRANTS

CROSS REFERENCE TO RELATED APPLICATION

This patent application is a U.S. National Stage application of International Patent Application Number PCT/CN2019/075131 filed Feb. 14, 2019 which is hereby incorporated by reference in its entirety.

FIELD

This disclosure relates to a communications network. More particularly, the present disclosure relates to configured grants.

BACKGROUND

A User Equipment (UE) in a communications network may use configured grants (CGs) to send network traffic.

In some cases, a UE may send packets of data that are duplicates of other, original, packets of data in order to increase the reliability that one of either the original packets of data or duplicate packets of data arrive successfully at the network.

Statement of Invention

According to a first aspect there is provided an apparatus comprising means for performing: receiving a configuration message from a base station, wherein the configuration message comprises instructions to use at least one first path for uplink transmission of a first group of data packets, and to use at least one configured grant in at least one second path for uplink transmission of duplicate packets of the first group of data packets; and in response to determining that at least one event has occurred, modifying at least one condition of the at least one configured grant for the uplink transmission of the duplicated packets.

According to some examples, the at least one configured grant comprises information of pre-allocated resources that can be used by the apparatus without requiring a scheduling grant from the base station.

According to some examples, the configuration message is a radio resource control message.

According to some examples, the at least one event comprises receipt of a control message from the base station.

According to some examples, the control message comprises a medium access control control element.

According to some examples, the control message comprises a Packet Data Convergence Protocol duplication activation control message or a Packet Data Convergence Protocol duplication deactivation control message.

According to some examples, the means are further configured to perform:
determining that the at least one event has occurred by determining that at least one triggering criterion has been met using status information from the at least one first path.

According to some examples, the means are further configured to perform:
determining that the at least one event has occurred by determining that at least one triggering criterion has been met using status information from the at least one second path.

According to some examples, the at least one triggering criterion comprises at least one of: a determination of a channel status; a determination of a transmission status; a determination that a transmission configuration is being used; a determination of a data transmission performance.

According to some examples, the modifying at least one condition comprises at least one of: deactivating the at least one configured grant for uplink transmission of duplicate packets of the first group of data packets; and activating the at least one configured grant for uplink transmission of duplicate packets of the first group of data packets.

According to some examples, the modifying at least one condition comprises prioritizing transmission using the at least one configured grant over other uplink grants that have an overlapping radio resource with the transmission using the at least one configured grant, or assigning a low priority to transmission using the at least one configured grant over other uplink grants that have an overlapping radio resource with the transmission using the at least one configured grant.

According to some examples, wherein the modifying at least one condition comprises: changing at least one parameter of the uplink transmission of the duplicated packets, wherein the at least one parameter of the uplink transmission of the duplicated packets comprises at least one of: a modulation and coding scheme; a transport block size; resource size/timing; transmission power; a number of repetitions; flag of enabling frequency hopping.

According to some examples, the means are further configured to perform:
starting a timer when the at least one triggering criterion is met; determining if the at least one triggering criterion is met upon expiry of the timer; and modifying at least one further condition for the uplink transmission of the duplicated packets when the at least one triggering criterion is still determined to be met upon expiry of the timer.

According to some examples, the apparatus is a user equipment.

According to some examples, a path may comprise a communication path in a network.

According to some examples, the at least one first path may comprise at least one first carrier and the at least one second path may comprise at least one second carrier.

According to some examples, the at least one first path may comprise at least one first serving cell and the at least one second path may comprise at least one second serving cell.

According to a second aspect there is provided an apparatus comprising at least one processor; and at least one memory including computer program code; the at least one memory and the computer program code configured to, with the at least one processor, cause the apparatus at least to perform receiving a configuration message from a base station, wherein the configuration message comprises instructions to use at least one first path for uplink transmission of a first group of data packets, and to use at least one configured grant in at least one second path for uplink transmission of duplicate packets of the first group of data packets; and in response to determining that at least one event has occurred, modifying at least one condition of the at least one configured grant for the uplink transmission of the duplicated packets.

According to some examples, the at least one configured grant comprises information of pre-allocated resources that can be used by the apparatus without requiring a scheduling grant from the base station.

According to some examples, the configuration message is a radio resource control message.

According to some examples, the at least one event comprises receipt of a control message from the base station.

According to some examples, the control message comprises a medium access control control element.

According to some examples, the control message comprises a Packet Data Convergence Protocol duplication activation control message or a Packet Data Convergence Protocol duplication deactivation control message.

According to some examples, the at least one memory and the computer program code are configured to, with the at least one processor, cause the apparatus at least to perform: determining that the at least one event has occurred by determining that at least one triggering criterion has been met using status information from the at least one first path.

According to some examples, the at least one memory and the computer program code are configured to, with the at least one processor, cause the apparatus at least to perform: determining that the at least one event has occurred by determining that at least one triggering criterion has been met using status information from the at least one second path.

According to some examples, the at least one triggering criterion comprises at least one of: a determination of a channel status; a determination of a transmission status; a determination that a transmission configuration is being used; a determination of a data transmission performance.

According to some examples, the modifying at least one condition comprises at least one of: deactivating the at least one configured grant for uplink transmission of duplicate packets of the first group of data packets; and activating the at least one configured grant for uplink transmission of duplicate packets of the first group of data packets.

According to some examples, the modifying at least one condition comprises prioritizing transmission using the at least one configured grant over other uplink grants that have an overlapping radio resource with the transmission using the at least one configured grant, or assigning a low priority to transmission using the at least one configured grant over other uplink grants that have an overlapping radio resource with the transmission using the at least one configured grant.

According to some examples, wherein the modifying at least one condition comprises: changing at least one parameter of the uplink transmission of the duplicated packets, wherein the at least one parameter of the uplink transmission of the duplicated packets comprises at least one of: a modulation and coding scheme; a transport block size; resource size/timing; transmission power; a number of repetitions; flag of enabling frequency hopping.

According to some examples, the at least one memory and the computer program code are configured to, with the at least one processor, cause the apparatus at least to perform: starting a timer when the at least one triggering criterion is met; determining if the at least one triggering criterion is met upon expiry of the timer; and modifying at least one further condition for the uplink transmission of the duplicated packets when the at least one triggering criterion is still determined to be met upon expiry of the timer.

According to some examples, the apparatus is a user equipment.

According to some examples, a path may comprise a communication path in a network.

According to some examples, the at least one first path may comprise at least one first carrier and the at least one second path may comprise at least one second carrier.

According to some examples, the at least one first path may comprise at least one first serving cell and the at least one second path may comprise at least one second serving cell.

According to a third aspect there is provided an apparatus comprising: receiving circuitry receiving a configuration message from a base station, wherein the configuration message comprises instructions to use at least one first path for uplink transmission of a first group of data packets, and to use at least one configured grant in at least one second path for uplink transmission of duplicate packets of the first group of data packets; and modifying circuitry for, in response to determining that at least one event has occurred, modifying at least one condition of the at least one configured grant for the uplink transmission of the duplicated packets.

According to a fourth aspect there is provided a method comprising: receiving to a configuration message from a base station, wherein the configuration message comprises instructions to use at least one first path for uplink transmission of a first group of data packets, and to use at least one configured grant in at least one second path for uplink transmission of duplicate packets of the first group of data packets; and in response to determining that at least one event has occurred, modifying at least one condition of the at least one configured grant for the uplink transmission of the duplicated packets.

According to some examples the at least one configured grant comprises information of pre-allocated resources that can be used by the apparatus without requiring a scheduling grant from the base station.

According to some examples, the configuration message is a radio resource control message.

According to some examples the at least one event comprises receipt of a control message from the base station.

According to some examples, the control message comprises a medium access control control element.

According to some examples, the control message comprises a Packet Data Convergence Protocol duplication activation control message or a Packet Data Convergence Protocol duplication deactivation control message.

According to some examples, the method comprises: determining that the at least one event has occurred by determining that at least one triggering criterion has been met using status information from the at least one first path.

According to some examples, the method comprises: determining that the at least one event has occurred by determining that at least one triggering criterion has been met using status information from the at least one second path.

According to some examples, the at least one triggering criterion comprises at least one of: a determination of a channel status; a determination of a transmission status; a determination that a transmission configuration is being used; a determination of a data transmission performance.

According to some examples, the modifying at least one condition comprises at least one of: deactivating the at least one configured grant for uplink transmission of duplicate packets of the first group of data packets; and activating the at least one configured grant for uplink transmission of duplicate packets of the first group of data packets.

According to some examples, the modifying at least one condition comprises prioritizing transmission using the at least one configured grant over other uplink grants that have an overlapping radio resource with the transmission using the at least one configured grant, or assigning a low priority to transmission using the at least one configured grant over other uplink grants that have an overlapping radio resource with the transmission using the at least one configured grant.

According to some examples the modifying at least one condition comprises: changing at least one parameter of the uplink transmission of the duplicated packets, wherein the at least one parameter of the uplink transmission of the duplicated packets comprises at least one of: a modulation and coding scheme; a transport block size; resource size/timing; transmission power; a number of repetitions; flag of enabling frequency hopping.

According to some examples, the method comprises: starting a timer when the at least one triggering criterion is met; determining if the at least one triggering criterion is met upon expiry of the timer; and modifying at least one further condition for the uplink transmission of the duplicated packets when the at least one triggering criterion is still determined to be met upon expiry of the timer.

According to some examples, the method is performed by a user equipment.

According to some examples, a path may comprise a communication path in a network.

According to some examples, the at least one first path may comprise at least one first carrier and the at least one second path may comprise at least one second carrier.

According to some examples, the at least one first path may comprise at least one first serving cell and the at least one second path may comprise at least one second serving cell.

According to a fifth aspect there is provided a computer program comprising instructions for causing an apparatus to perform at least the following: receiving a configuration message from a base station, wherein the configuration message comprises instructions to use at least one first path for uplink transmission of a first group of data packets, and to use at least one configured grant in at least one second path for uplink transmission of duplicate packets of the first group of data packets; and in response to determining that at least one event has occurred, modifying at least one condition of the at least one configured grant for the uplink transmission of the duplicated packets.

According to a sixth aspect there is provided a computer program comprising instructions stored thereon for performing at least the following receiving a configuration message from a base station, wherein the configuration message comprises instructions to use at least one first path for uplink transmission of a first group of data packets, and to use at least one configured grant in at least one second path for uplink transmission of duplicate packets of the first group of data packets; and in response to determining that at least one event has occurred, modifying at least one condition of the at least one configured grant for the uplink transmission of the duplicated packets.

According to a seventh aspect there is provided a non-transitory computer readable medium comprising program instructions for causing an apparatus to perform at least the following: receiving a configuration message from a base station, wherein the configuration message comprises instructions to use at least one first path for uplink transmission of a first group of data packets, and to use at least one configured grant in at least one second path for uplink transmission of duplicate packets of the first group of data packets; and in response to determining that at least one event has occurred, modifying at least one condition of the at least one configured grant for the uplink transmission of the duplicated packets.

According to an eighth aspect there is provided a non-transitory computer readable medium comprising program instructions stored thereon for performing at least the following: receiving a configuration message from a base station, wherein the configuration message comprises instructions to use at least one first path for uplink transmission of a first group of data packets, and to use at least one configured grant in at least one second path for uplink transmission of duplicate packets of the first group of data packets; and in response to determining that at least one event has occurred, modifying at least one condition of the at least one configured grant for the uplink transmission of the duplicated packets.

According to a ninth aspect there is provided an apparatus comprising means for performing: sending a configuration message to a user equipment, wherein the configuration message comprises instructions for the user equipment to use at least one first path for uplink transmission of a first group of data packets, and to use at least one configured grant in at least one second path for uplink transmission of duplicate packets of the first group of data packets; wherein the configuration message comprises an indication for instructing the user equipment to modify the at least one configured grant for the uplink transmission of the duplicated packets when at least one event has occurred.

According to some examples, the at least one configured grant comprises information of pre-allocated resources that can be used by the user equipment without requiring a scheduling grant from the base station.

According to some examples, the configuration message is a radio resource control message.

According to some examples, the means are further configured to perform sending a control message to the user equipment, and wherein the indication comprises information informing the user equipment that the event comprises receipt of the control message.

According to some examples, the control message comprises a medium access control control element.

According to some examples, the control message comprises a Packet Data Convergence Protocol duplication activation control message or a Packet Data Convergence Protocol duplication deactivation control message.

According to some examples, the configuration message comprises at least one triggering criterion of status information from the first path, and wherein the indication comprises information informing the user equipment that the event comprises the at least one triggering criterion being met.

According to some examples, the configuration message comprises at least one triggering criterion of status information from the second path, and wherein the indication comprises information informing the user equipment that the event comprises the at least one triggering criterion being met.

According to some examples, the at least one triggering criterion comprises at least one of: a determination of a channel status; a determination of a transmission status; a determination that a transmission configuration is being used; a determination of a data transmission performance.

According to some examples, a path may comprise a communication path in a network.

According to some examples, the at least one first path may comprise at least one first carrier and the at least one second path may comprise at least one second carrier.

According to some examples, the at least one first path may comprise at least one first serving cell and the at least one second path may comprise at least one second serving cell.

According to a tenth aspect there is provided an apparatus comprising at least one processor; and at least one memory including computer program code; the at least one memory and the computer program code configured to, with the at least one processor, cause the apparatus at least to perform: sending a configuration message to a user equipment, wherein the configuration message comprises instructions for the user equipment to use at least one first path for uplink transmission of a first group of data packets, and to use at least one configured grant in at least one second path for uplink transmission of duplicate packets of the first group of data packets; wherein the configuration message comprises an indication for instructing the user equipment to modify the at least one configured grant for the uplink transmission of the duplicated packets when at least one event has occurred.

According to some examples, the at least one configured grant comprises information of pre-allocated resources that can be used by the user equipment without requiring a scheduling grant from the base station.

According to some examples, the configuration message is a radio resource control message.

According to some examples, the at least one processor; and at least one memory including computer program code; the at least one memory and the computer program code configured to, with the at least one processor, cause the apparatus at least to perform: sending a control message to the user equipment, and wherein the indication comprises information informing the user equipment that the event comprises receipt of the control message.

According to some examples, the control message comprises a medium access control control element.

According to some examples, the control message comprises a Packet Data Convergence Protocol duplication activation control message or a Packet Data Convergence Protocol duplication deactivation control message.

According to some examples, the configuration message comprises at least one triggering criterion of status information from the first path, and wherein the indication comprises information informing the user equipment that the event comprises the at least one triggering criterion being met.

According to some examples, the configuration message comprises at least one triggering criterion of status information from the second path, and wherein the indication comprises information informing the user equipment that the event comprises the at least one triggering criterion being met.

According to some examples, the at least one triggering criterion comprises at least one of: a determination of a channel status; a determination of a transmission status; a determination that a transmission configuration is being used; a determination of a data transmission performance.

According to some examples, a path may comprise a communication path in a network.

According to some examples, the at least one first path may comprise at least one first carrier and the at least one second path may comprise at least one second carrier.

According to some examples, the at least one first path may comprise at least one first serving cell and the at least one second path may comprise at least one second serving cell.

According to a eleventh aspect there is provided an apparatus comprising: sending circuitry for sending, a configuration message to a user equipment, wherein the configuration message comprises instructions for the user equipment to use at least one first path for uplink transmission of a first group of data packets, and to use at least one configured grant in at least one second path for uplink transmission of duplicate packets of the first group of data packets; wherein the configuration message comprises an indication for instructing the user equipment to modify the at least one configured grant for the uplink transmission of the duplicated packets when at least one event has occurred.

According to a twelfth aspect there is provided a method comprising: sending a configuration message to a user equipment, wherein the configuration message comprises instructions for the user equipment to use at least one first path for uplink transmission of a first group of data packets, and to use at least one configured grant in at least one second path for uplink transmission of duplicate packets of the first group of data packets; wherein the configuration message comprises an indication for instructing the user equipment to modify the at least one configured grant for the uplink transmission of the duplicated packets when at least one event has occurred.

According to some examples the at least one configured grant comprises information of pre-allocated resources that can be used by the user equipment without requiring a scheduling grant from the base station.

According to some examples the method comprises sending a control message to the user equipment, and wherein the indication comprises information informing the user equipment that the event comprises receipt of the control message.

According to some examples the control message comprises a medium access control control element.

According to some examples the control message comprises a Packet Data Convergence Protocol duplication activation control message or a Packet Data Convergence Protocol duplication deactivation control message.

According to some examples the configuration message comprises at least one triggering criterion of status information from the first path, and wherein the indication comprises information informing the user equipment that the event comprises the at least one triggering criterion being met.

According to some examples the configuration message comprises at least one triggering criterion of status information from the second path, and wherein the indication comprises information informing the user equipment that the event comprises the at least one triggering criterion being met.

According to some examples, the at least one triggering criterion comprises at least one of: a determination of a channel status; a determination of a transmission status; a determination that a transmission configuration is being used; a determination of a data transmission performance.

According to some examples, a path may comprise a communication path in a network.

According to some examples, the method is performed by a user equipment.

According to some examples, the at least one first path may comprise at least one first carrier and the at least one second path may comprise at least one second carrier.

According to some examples, the at least one first path may comprise at least one first serving cell and the at least one second path may comprise at least one second serving cell.

According to a thirteenth aspect there is provided a computer program comprising instructions for causing an apparatus to perform at least the following: sending, a configuration message to a user equipment, wherein the configuration message comprises instructions for the user equipment to use at least one first path for uplink transmission of a first group of data packets, and to use at least one configured grant in at least one second path for uplink transmission of duplicate packets of the first group of data packets; wherein the configuration message comprises an indication for instructing the user equipment to modify the at least one configured grant for the uplink transmission of the duplicated packets when at least one event has occurred.

According to a fourteenth aspect there is provided a computer program comprising instructions stored thereon for performing at least the following: sending a configuration message to a user equipment, wherein the configuration message comprises instructions for the user equipment to use at least one first path for uplink transmission of a first group of data packets, and to use at least one configured grant in at least one second path for uplink transmission of duplicate packets of the first group of data packets; wherein the configuration message comprises an indication for instructing the user equipment to modify the at least one configured grant for the uplink transmission of the duplicated packets when at least one event has occurred.

According to a fifteenth aspect there is provided a non-transitory computer readable medium comprising program instructions for causing an apparatus to perform at least the following: sending a configuration message to a user equipment, wherein the configuration message comprises instructions for the user equipment to use at least one first path for uplink transmission of a first group of data packets, and to use at least one configured grant in at least one second path for uplink transmission of duplicate packets of the first group of data packets; wherein the configuration message comprises an indication for instructing the user equipment to modify the at least one configured grant for the uplink transmission of the duplicated packets when at least one event has occurred.

According to an sixteenth aspect there is provided a non-transitory computer readable medium comprising program instructions stored thereon for performing at least the following: sending a configuration message to a user equipment, wherein the configuration message comprises instructions for the user equipment to use at least one first path for uplink transmission of a first group of data packets, and to use at least one configured grant in at least one second path for uplink transmission of duplicate packets of the first group of data packets; wherein the configuration message comprises an indication for instructing the user equipment to modify the at least one configured grant for the uplink transmission of the duplicated packets when at least one event has occurred.

BRIEF DESCRIPTION OF FIGURES

The invention will now be described in further detail, by way of example only, with reference to the following examples and accompanying drawings, in which:

FIG. 2 shows a schematic example of a control message according to an example;

DETAILED DESCRIPTION

Figure 1:
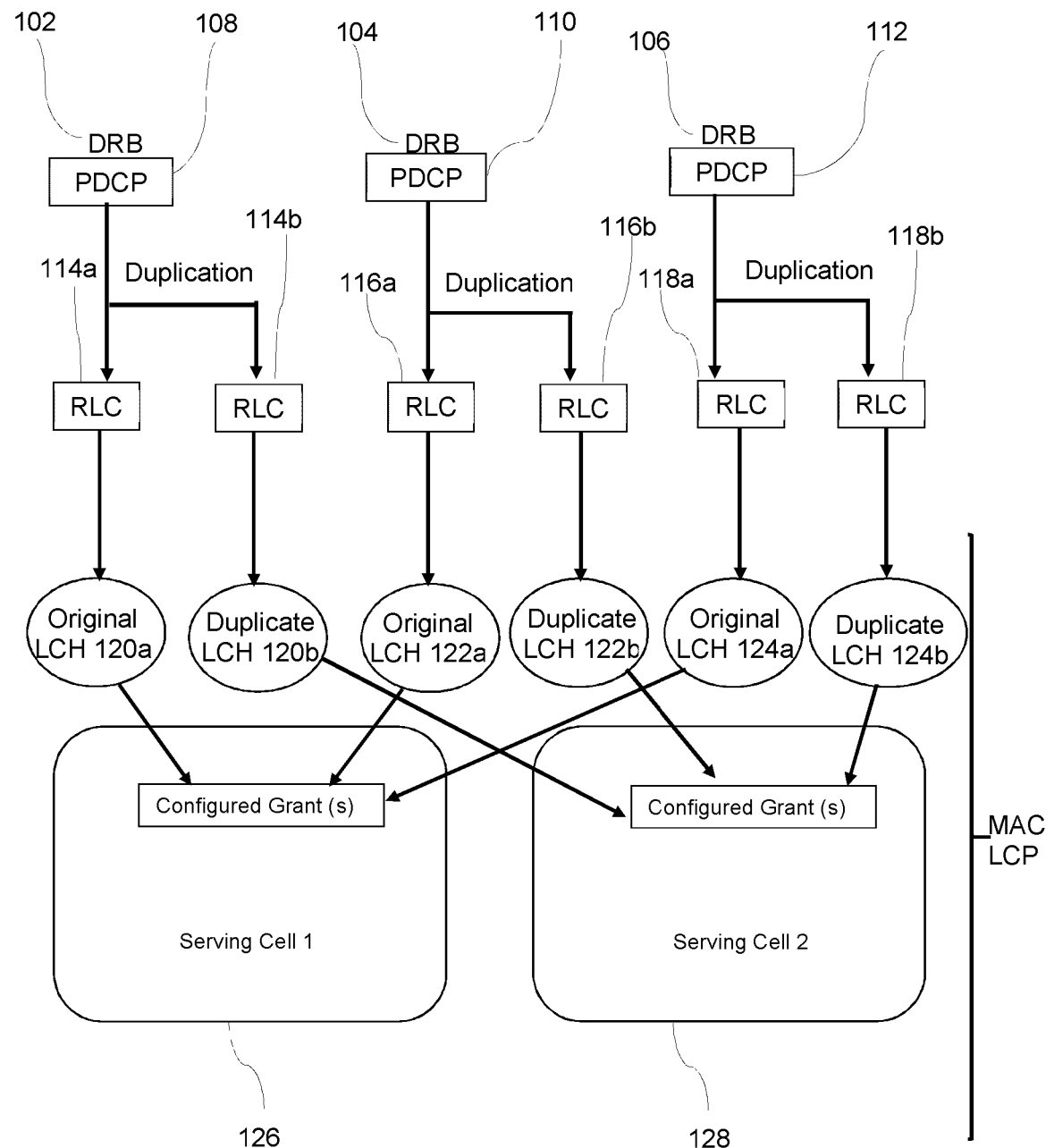
FIG. 1 shows a schematic example of how certain blocks of data may be sent over a network according to an example.

The present disclosure relates to wireless communications. More particularly, some examples relate to 5G New Radio (NR) wireless communications.

In 5G NR, Packet Data Convergence Protocol (PDCP) duplication has been employed as an effective approach to tackle the challenges of providing Ultra-Reliable Low-Latency Communications (URLLC).

When using PDCP duplication, duplicated PDCP Protocol Data Units (PDUs) can be processed and transmitted over independent paths. These independent paths may be, for example, different component carriers in Carrier Aggregation (CA), or different nodes in Dual-connectivity (DC). In some cases, by processing and transmitting duplicated PDCP PDUs over independent paths, Quality of Service (QoS) of URLLC can be achieved via diversity gain. These independent paths may comprise different carriers. Each independent path may comprise at least one carrier. Each independent path may comprise a different carrier. Each path may comprise at least one serving cell. Each independent path may comprise a different serving cell. In some examples, a path may be considered as a communication path in a network. A first carrier may comprise a first bandwidth part. A second carrier may comprise a second bandwidth part.

To provide frequency and/or spatial diversity when using PDCP duplication, a PDCP PDU and its duplicate can be transmitted on two different serving cells (i.e. by two different component carriers and/or network nodes) to ensure frequency and/or spatial diversity.

PDCP duplication schemes increase the probability of successful communication, because when a receiver fails to decode a PDCP PDU, it can exploit a duplicate version of a PDCP PDU to recover the data over time, thereby improving both reliability and latency performance. On the other hand, if the receiver managed to decode one of the copies successfully, the other copy of the PDCP PDU will be discarded.

Provisioning radio resources that can be used by delay-sensitive traffic is another key approach introduced in NR for URLLC. In particular, uplink transmission based on Configured Grants (CG) has been adopted in Rel-15 to reduce potential latency caused by Scheduling Request (SR) and Buffer Status Report (BSR) procedures, as in earlier versions of 3GPP radio access systems. With CG, uplink resources are pre-allocated and occur in a periodic manner. A User Equipment (UE) may utilize these pre-allocated resources for uplink transmission when the pre-allocated resources are available without needing to wait for a scheduling grant from the 5G Node B (gNB). In Rel-15, one single CG can be activated in each Bandwidth Part (BWP) per serving cell. As an extension to support various traffic types, multiple active CGs per BWP may be supported in Rel-16.

The CG supported by 5G NR can be classified into Type-1 and Type-2:

Type-1 CG is solely configured by the Radio Resource Control (RRC) and is activated as soon as the RRC configuration is completed.

Type-2 CG is configured by the RRC, but is activated/deactivated (along with remaining scheduling information) by L1 signaling dynamically.

In both cases, a gNB assigns a set of parameters, such as, for example: a Modulation and Coding Scheme (MCS), Transport Block Size (TBS); resource size/timing; and power-related settings to each grant. The UE can then use these CGs using these set of parameters.

FIG. 1 shows an example of PDCP duplication using CGs.

When uplink PDCP duplication is applied for periodic URLLC traffic, by default the PDCP duplication is mapped to configured grant in both serving cells involved in duplication, as illustrated in FIG. 1.

FIG. 1 shows example Data Radio Bearers (DRBs) 102, 104 and 106. In FIG. 1, duplication of DRBs 102, 104 and 106 is activated. In the example of FIG. 1, DRB 102 has a corresponding PDCP entity 108, DRB 104 has a corresponding PDCP entity 110 and DRB 106 has a corresponding PDCP entity 112. Packets of data can be sent on each DRB.

In the example of FIG. 1, when duplication of a DRB is activated, two RLC entities are established for the PDCP entity corresponding to the DRB. The two RLC entities can be used to process the original and duplicated PDCP PDUs. For example, when duplication of PDCP entity 108 corresponding to DRB 102 is activated, RLCs 114a and 114b are established. Similarly, when duplication of PDCP entity 110 corresponding to DRB 104 is activated, RLC entities 116a and 116b are established, and when duplication of PDCP entity 112 corresponding to DRB 106 is activated RLCs 118a and 118b are established.

Each of the established RLC entities 114a, 114b, 116a, 116b, 118a and 118b are associated to a Logical Channel, LCH. In the example of FIG. 1, DRB 102 is associated with an original LCH 120a and duplicate LCH 120b. An original LCH may be considered to be the LCH which is not a duplicate LCH. A duplicate LCH carries duplicates of packets from an original LCH. DRB 104 is associated with an original LCH 122a and duplicate LCH 122b. DRB 106 is associated with an original LCH 124a and a duplicate LCH 124b. Therefore, an original and duplicate LCH is associated with each DRB 102, 104 and 106. In the Medium Access Control (MAC) protocol layer, for each DRB 102, 104 and 106, the two LCHs (the original and duplicate LCH) are mapped to different serving cells 126 and 128. By using different carriers and/or network nodes, greater diversity can be provided.

In some wireless networks, a UE can be configured with at least two component carriers. These at least two component carriers can be used for providing duplication.

In some wireless networks, a UE can be configured with at least two network nodes. These at least two network nodes can be used for providing duplication.

Furthermore, at least one configured grant may be activated in each of the component carriers and/or network nodes. A setup of such a wireless network may be useful for providing URLLC-related features.

For example, in Rel-16, URLLC could be used to support Industrial Internet of Things (IIoT) use cases. IIoT use cases could be, for example, motion control of robotic arms at locations such as factories, for example. In particular, 5G wireless connectivity could be used to replace typical wired (e.g. Ethernet) connections in Time-Sensitive Networks (TSN) topology. In many cases, such as in IIoT applications for example, network traffic is often predictable. This is because the network traffic may have a certain periodicity and deterministic payload. Therefore, based on such characteristics, CG for transmission of TSN traffic could be used in such a network.

Furthermore, in some networks, reliability of network traffic may be important to the functioning of the network. For example, in a network used for factory automation, network traffic reliability is important to ensure that factory automations are correctly and properly automated. In cases such as these, tools such as PDCP duplication can be employed to provide the required degree of reliability of network traffic.

PDCP duplication in an Uplink (UL) direction can be activated and deactivated by a gNB on a per-DRB basis. An RRC configuration provides an initial configuration related to whether PDCP duplication is applicable for each DRB. Subsequently, an activation status of duplication of each DRB configured with PDCP duplication can be indicated via a MAC Control Element (CE) command.

Figure 2:
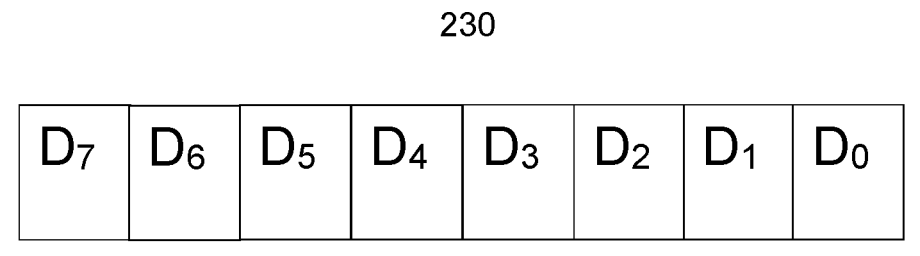

FIG. 2 shows an example of a Duplication Activation/Deactivation MAC CE 230. The Duplication Activation/Deactivation MAC CE 230 could be multiplexed into a MAC PDU for the purpose of activating or deactivating duplication of DRBs. In this example, each field Di of MAC CE 230 indicates the activation/deactivation status of the PDCP duplication of DRB i, where i is the ascending order of the DRB ID among the DRBs configured with PDCP duplication and with RLC entity(ies) associated with this MAC entity. $D_0$ indicates the activation/deactivation status of the PDCP duplication of a DRB 0, for example, and $D_7$ indicates the activation/deactivation status of the PDCP duplication of a DRB 7, for example. The Di field can be set to one to indicate that the PDCP duplication of DRB i should be activated. The Di field can set to zero to indicate that the PDCP duplication of DRB i should be deactivated.

In some examples, an operational mode of CG is provided. A type of CG is also provided.

In some examples, the CG may include one or more of the following features:
- the CG can be dedicated to uplink transmission of duplicated packets;
- the CG can be activated or deactivated based on MAC CE relating to PDCP duplication activation/deactivation;
- the CG can be activated or deactivated based on certain pre-configured criteria that may be relevant to the counterpart packets of the duplicates in another carrier and/or network node (e.g. in another serving cell(s));
- the CG may fall back (revert) to an ordinary CG that can carry other network traffic when duplication of the corresponding DRB is deactivated, i.e. the restriction for duplication LCH is lifted;
- the CG may autonomously re-configure its parameters based on certain pre-configured criteria that may be relevant to the counterpart packets of the duplicates in another carrier or network node (e.g. another serving cell(s)), and/or activation/deactivation of duplication the corresponding DRB; and
- the CG can be prioritized or deprioritized in cases of resource collision with other grants based on certain pre-configured criteria that may be relevant to the counterpart packets of the duplicates in another carrier (e.g. another serving cell(s)).

In some examples, a type of CG may be configured in the same manner as a Type-1 CG and could be specified and/or implemented as an extension of Type-1 CG. The CG may initially be configured by an RRC message similarly to Type-1 CG. The RRC message may comprise an indication that each CG instance should be dynamically activated or deactivated in accordance to duplication related status/signalling instead of always being activated until the next RRC-reconfiguration. The RRC message may comprise an indication that each CG instance should be dynamically activated or deactivated based on the determination that an event has taken place. Duplication related status/signalling may comprise a MAC CE similar to MAC CE 230.

Alternatively, rather than deactivation, the CG can act as a CG that could carry any traffic when the duplication of its associated LCH/DRB is deactivated, but will be again converted to a CG for carrying duplicated packets from the designated DRB when duplication of the designated DRB is activated.

In some examples, a configuration message of the CG may include an information element to indicate that the CG is restricted for transmission of packets from duplicate-LCHs/Radio Bearers (RBs).

In some examples, a configuration message of the CG may include an information element to indicate that the CG is restricted for transmission of packets from a subset of duplicate-LCHs/RBs. The identifiers of the corresponding duplicate LCHs/RBs in the subset of duplicate LCHs/RBs can also be included in the information element.

In some examples, a configuration message may also include one or more triggering criteria that can cause (trigger) the CG to conduct changes when the triggering criteria are met. These changes may be, for example, activation/deactivation, lifting/applying LCH restrictions and/or adjusting parameters etc.

The triggering criteria may depend on the channel status (e.g. the corresponding radio link) for the carrier or serving cell that the original LCH is mapped to. The triggering criteria may depend on the channel status (e.g. the corresponding radio link) for the serving cell that the original LCH is mapped to. For example, the triggering criteria may comprise a determination that a Channel Quality Indicator (CQI) relating to the radio link for an original LCH has stayed below a threshold for a certain time period.

The triggering criteria may comprise a determination that the air interface for an original LCH is undertaking a beam recovery process.

In some examples, the triggering criteria may comprise transmission status of the original LCH. For example, the triggering criteria may depend on an accumulated queuing delay of the original LCH. An accumulated queuing delay of the original LCH may be indicated by how long the buffer of the original LCH has been non-empty. The triggering criteria may depend on a sequence number of the packet that the original LCH is currently processing.

In some examples, the triggering criteria may comprise transmission configurations for the original LCH, for example parameters relating to settings of at least one of MCS, Transport Block Size (TBS), Power, Hybrid Automatic Repeat Request (HARQ), Multiple-Input Multiple Output (MIMO), Non-Orthogonal Multiple Access (NOMA) for transmission of a MAC PDU comprising at least one MAC Service Data Unit (SDU) associated with the original LCH mapped to other serving cell(s). The triggering criteria may depend on the allocated physical resource for the original LCH such as Physical Uplink Shared Channel (PUSCH) size, numerology, bandwidth part (BWP) and grant type (dynamic or configured) for transmission of MAC PDU comprising at least one MAC SDU associated with the original LCH mapped to other carrier(s) or serving cell(s) (i.e. to other path(s)).

In some examples, the triggering criteria may comprise the data transmission performance of the original LCH. In examples, the original LCH is mapped to a path, or paths, other than the path(s) to which the duplicate LCH is mapped to. The data transmission performance may be indicated by absolute or average performance of at least one past packet. The performance may be determined by evaluating if, for example, the number of received HARQ negative acknowledgments (NACK) for the Transport Block (or part of it) has exceeded a threshold or if the number of Automatic Repeat Request (ARQ) NACK concerning the original LCH has exceeded a threshold. In particular, the threshold may be set to one and in such a case the triggering criteria will be met once a single HARQ NACK or ARQ NACK is received.

It will be appreciated that the triggering criteria may comprise one or more of the above listed examples of triggering criteria.

In examples where there are multiple paths for the original LCH, the triggering criteria can be determined to be met when any or all of the paths of the original LCH meet the triggering criteria.

In examples, the triggering criteria comprise pre-configured criteria.

Figure 3:
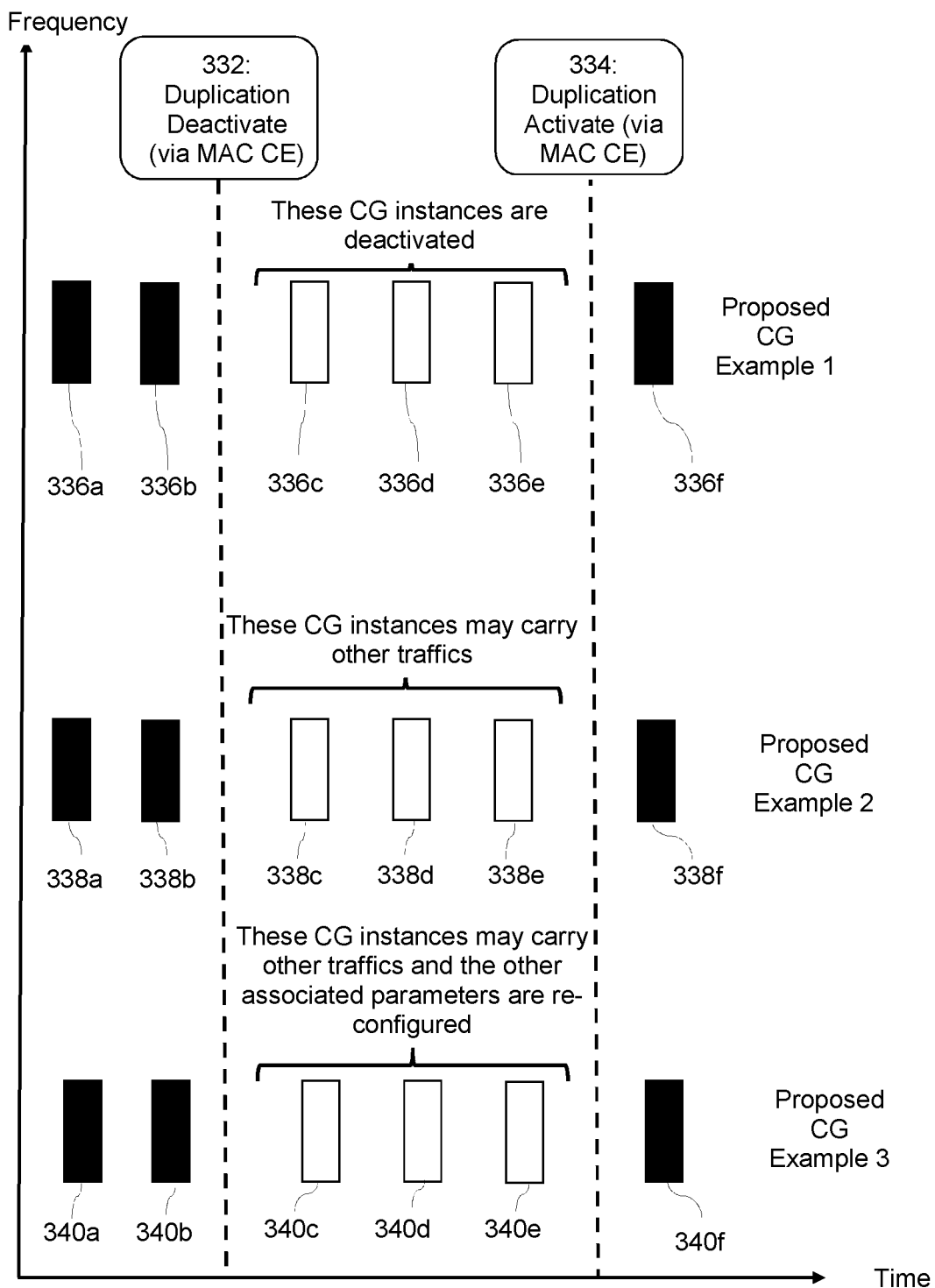
FIG. 3 shows a schematic of a method according to an example.

FIG. 3 shows three examples of how the behaviour of a CG may change when duplication of a DRB associated to a LCH which the CG is assigned to is deactivated at 332. The duplication may be deactivated via a MAC CE. FIG. 3 also shows three examples of how the behaviour of a CG may change when duplication of a DRB associated to a LCH which the CG is assigned to is activated, or reactivated, at 334. This activation (or reactivation) may be via a MAC CE.

Example 1 of FIG. 3 shows CG instances 336a and 336b which can be used for a duplicate-LCH. At 332, CG instances of duplicate-CG restricted to a duplicate-LCH are temporarily deactivated after a UE receives a MAC CE indicating deactivation of duplication of the DRB corresponding to the duplicated LCH. CG instances 336c, 336d and 336e are deactivated. At 334, the CG instances of duplicate-CG are reactivated via a MAC CE. CG instance 336f can be used for a duplicate-LCH similarly to CG instances 336a and 336b.

Example 2 of FIG. 3 shows CG instances 338a and 338b which can be used for a duplicate-LCH. At 332, CG instances of duplicate-CG restricted to a duplicate-LCH are temporarily not restricted to the designated duplicate-LCH and can carry traffics from any other LCHs, after the UE receives the MAC CE indicating deactivation of duplication of the DRB corresponding to the duplicated LCH, until the duplication is activated again. CG instances 338c, 338d and 338e can therefore be used to carry traffics from other LCHs. At 334, the CG instances of duplicate-CG are reactivated via a MAC CE. CG instance 338f can be used for a duplicate-LCH similarly to CG instances 338a and 338b.

Example 3 of FIG. 3 shows CG instances 340a and 340b which can be used for a duplicate-LCH. At 332, CG instances 340c, 340d and 340e of duplicate-CG restricted to a duplicate-LCH are temporarily not restricted to the designated duplicate-LCH and can carry traffics from any other LCHs, along with temporary changes of CG parameters such as MCS/TBS, TX power, number of repetitions etc., after the UE receives the MAC CE at 332 indicating deactivation of duplication of the DRB corresponding to the duplicated LCH, until the duplication is activated again. At 334, the CG instances of duplicate-CG are reactivated via a MAC CE. CG instance 340f can be used for a duplicate-LCH similarly to CG instances 340a and 340b.

Figure 4:
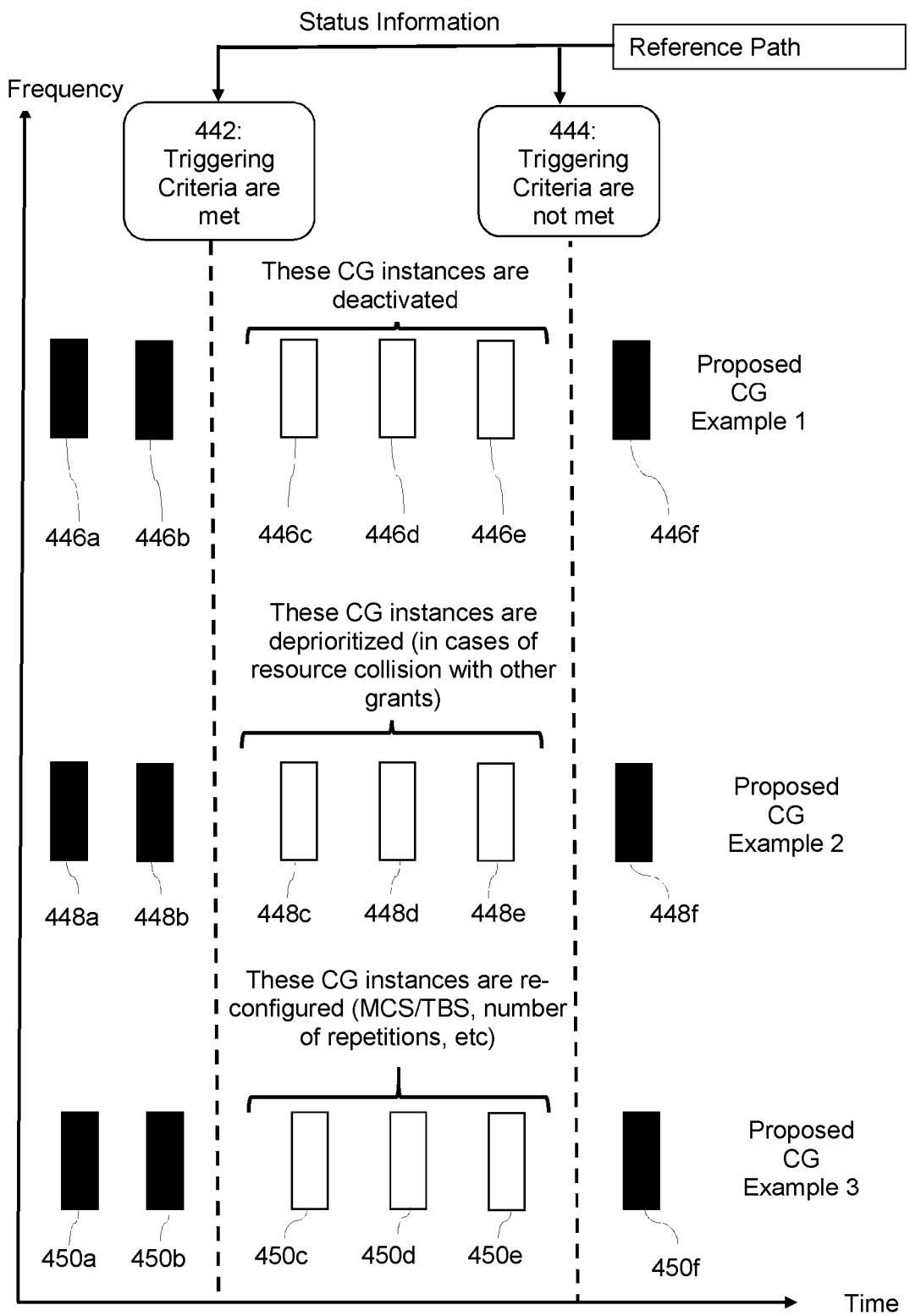
FIG. 4 shows a schematic of a method according to an example.

FIG. 4 shows three examples of how the behaviour of a CG may change when certain pre-configured criteria relevant to another path are triggered. The another path may serve an original LCH.

In Example 1 of FIG. 4, CG instances 446a and 446b can be used for duplicate LCH. The CG instances of duplicate-CG restricted to a duplicate-LCH are temporarily deactivated at 442 after certain pre-configured criteria relating to another serving cell (the reference serving cell) are met. The pre-configured criteria may comprise triggering criteria. In some examples, the another path corresponds to the component path where an original-LCH is mapped to. The criteria can be related to, for example, radio link quality of the path serving the original LCH. When the radio link quality of the original LCH path is sufficiently high and exceeds a certain threshold, transmission of duplicates are deemed to become unnecessary, so the duplicate CGs 446c, 446d and 446e may be deactivated. Other triggering criteria, as discussed above, may also be used. The determination as to whether the triggering criteria are met may be based on status information from the reference path. More spare resources can become available for a gNB to schedule other traffics when the duplicate CGs are deactivated. Alternatively, these CG instances can stay activated, but are used to serve other traffics. At 444, the triggering criteria are not met. The triggering criteria used at 444 may be different to the triggering criteria used at 442. The triggering criteria used at 444 may also be the same as the triggering criteria used at 442. CG instance 446f can be used for a duplicate-LCH similarly to CG instances 446a and 446b.

In Example 2 of FIG. 4, CG instances 448a and 448b can be used for duplicate LCH. The CG instances 450c, 450d and 450e of duplicate-CG restricted to a duplicate-LCH, are temporarily deprioritized at 442 when certain criteria relating to another path (the reference path) are met. In some examples, the another path corresponds to the path where an original-LCH is mapped to. The certain criteria may comprise triggering criteria. This means that, if one of these duplicate-CG instances collides with another grant in time, the UE should prioritize transmission using other colliding grants if the pre-configured conditions are met. As the UE is assumed to be capable of transmitting one Physical Uplink Shared Channel (PUSCH) on a single serving cell at a time only, it is undesirable for the UE to delay other traffics in order to prioritize duplicated packets when transmission of the duplicated packets are less important. Therefore, in this example, when the path handling the original-LCH has sufficiently good performance, the duplicate-CGs can be deprioritized. Duplicate CG instances 448c, 448d and 448e are deprioritized. The determination as to whether the triggering criteria are met may be based on status information from the reference path. At 444, the triggering criteria are not met. CG instance 448f can be used for a duplicate-LCH similarly to CG instances 448a and 448b.

In Example 3 of FIG. 4, CG instances 450a and 450b can be used for duplicate LCH. The parameters associating to the duplicate-CG restricted to a duplicate-LCH, are temporarily changed at 442 when certain pre-configured conditions relevant to another path (the reference path) are met. In some examples, the another path corresponds to the path where an original-LCH is mapped to. The parameters associating to a CG include MCS, TBS, transmission power, number of repetitions, and HARQ settings. Such a mechanism provides the duplicate-CG more flexibility to improve efficiency and/or reliability when it is needed. For instance, when the link quality of a reference path degrades, the duplicate CGs may increase the transmission power and number of repetitions (or decrease MCS) of the CG instances to improve transmission reliability. The determination as to whether the triggering criteria are met may be based on status information from the reference path. At 444, the triggering criteria are not met. CG instance 448f can be used for a duplicate-LCH similarly to CG instances 448a and 448b.

Figure 5:
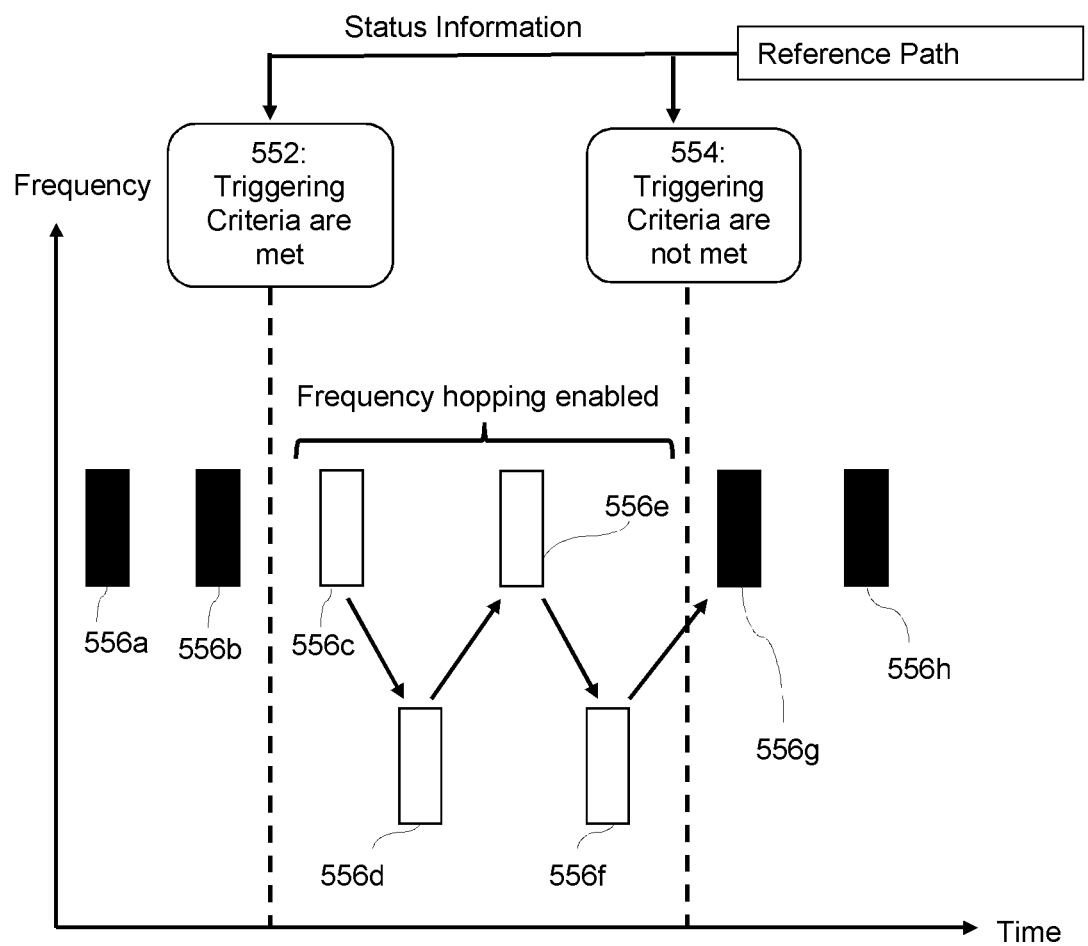
FIG. 5 shows a schematic of a method according to an example.

FIG. 5 shows an example where frequency hopping of the duplicate-CG is enabled to achieve frequency diversity gain when triggering criteria are met in the reference path. The reference path may correspond to the path where an original-LCH is mapped. When the triggering criteria are met, this may give an indication that the transmission in the reference path is deemed less reliable than required. It may be determined that the triggering criteria are met based on status information from the reference path.

When the triggering criteria are determined to be met at 552 the duplicate CG may begin to switch between two distinct resources in the frequency domain. For duplicate CG instances 556a and 556b, frequency hopping is not enabled. At 552, triggered by the criteria relating to the original LCH performance on another path, the duplicate CG may begin to switch between two or more distinct resources in the frequency domain. For CG instances 556c, 556d, 556e and 556f frequency hopping is enabled. At 554 it is determined that the triggering criteria are no longer met. The triggering criteria used at 554 may be different to the triggering criteria used at 552. The triggering criteria used at 554 may also be the same as the triggering criteria used at 552. This determination may be based on status information received from the reference path. Frequency hopping is then disabled for CG instances 556g and 556h. Frequency hopping may be activated and deactivated by changing at least one parameter of the uplink transmission. Changing at least one parameter of the uplink transmission may comprise changing at least one parameter of the uplink transmission of duplicate data packets. Changing at least one parameter of the uplink transmission may comprise modifying a data parameter comprising a flag of enabling frequency hopping.

Figure 6:
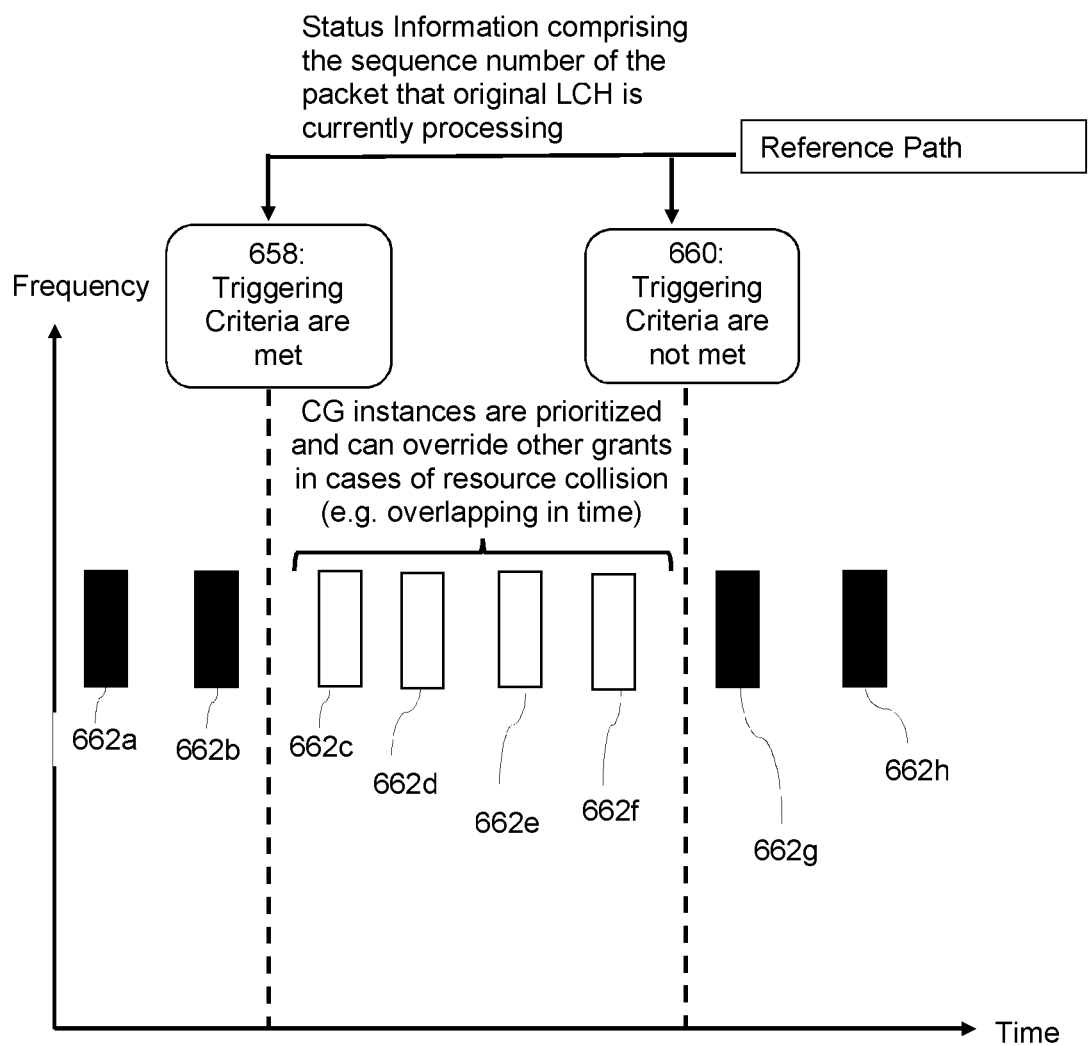
FIG. 6 shows a schematic of a method according to an example.

FIG. 6 shows an example where transmission using the duplicate-CG is autonomously prioritized temporally. When transmission using the duplicate CG is prioritized, can override other grants if their corresponding PUSCH resource collide in either a time domain or a frequency domain. This may be useful for a case where a similar progress between two legs (i.e. the RLC entities corresponding to original LCH and duplicate LCH) is desirable. Duplicate CG instances are shown at 662a and 662b. The original LCH on other path(s), which may be considered as a reference path, shares information relating to the sequence number of the packet it is currently processing. If the shared sequence number is larger than the sequence number of the packet that the duplicate LCH is currently processing to a certain extent (e.g. the sequence number difference exceeds a threshold), then this indicates that the duplicate LCH is lagging behind and should "accelerate" to achieve pace synchronization with the original LCH. Hence, autonomously prioritizing the corresponding duplicate-CG instances may facilitate the acceleration.

At 658, triggering criteria are met. These triggering criteria may comprise a determination that the sequence number of a packet that the original LCH is currently processing is a predetermined threshold greater than the sequence number of the packet that the duplicate LCH is currently processing. Duplicate CG instances 662c, 662d, 662e and 662f are prioritized and can override other grants in cases of resource collision. At 660, the triggering criteria are determined to no longer be met. The triggering criteria used at 660 may be different to the triggering criteria used at 658. The triggering criteria used at 660 may also be the same as the triggering criteria used at 658. This may indicate that the sequence number of packet that the original LCH is currently processing is no longer a predetermined threshold greater than the sequence number of the packet that the duplicate LCH is currently processing. Duplicate CG instances 662g and 662h are not prioritized.

Figure 7:
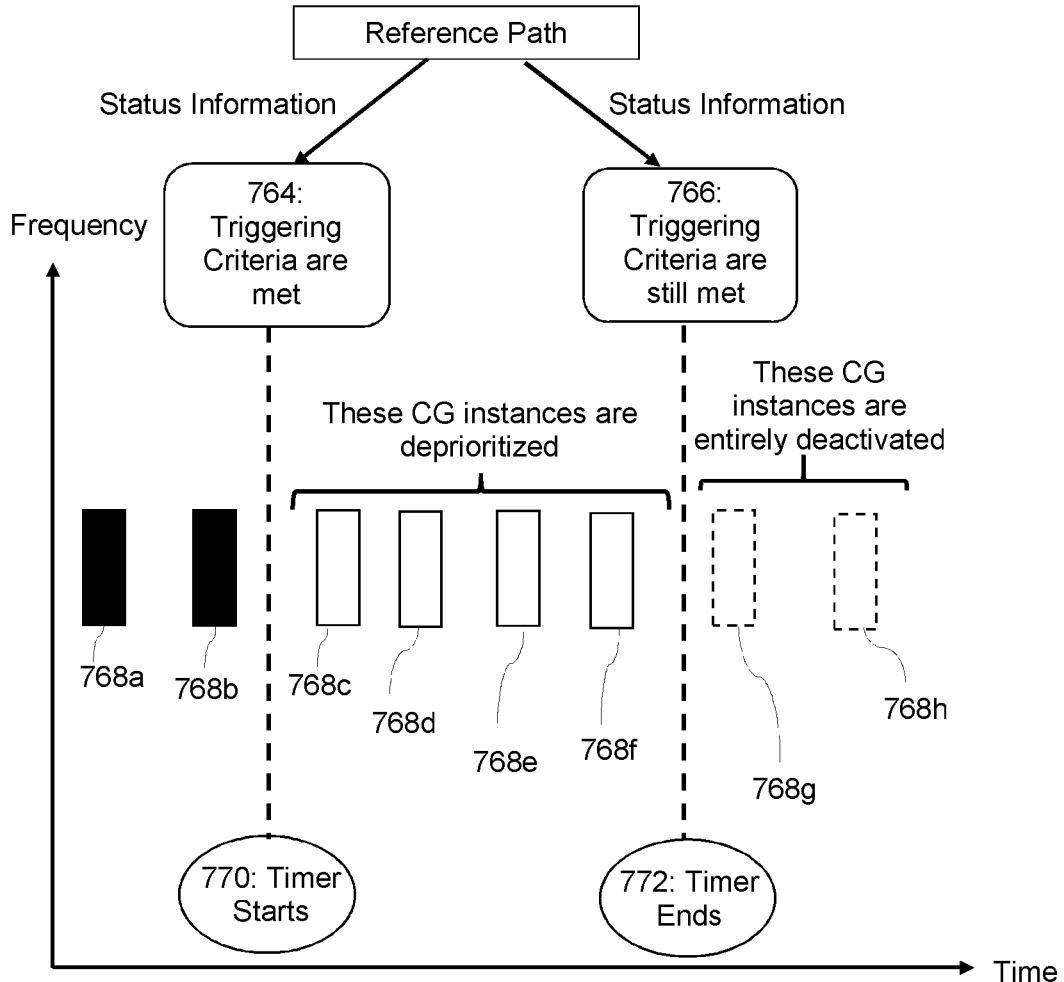
FIG. 7 shows a schematic of a method according to an example.

FIG. 7 shows an example wherein a CG is first deprioritized based on the triggering criteria being met at 764 relating to the reference path. The reference path may be a reference serving cell. The reference path may be a reference carrier. CG instances 768c, 768d, 768e and 768f are deprioritized in relation to other network traffic. A timer starts at 770 when the triggering criteria are met. It may be determined that the triggering criteria are met based on status information from the reference path. The deprioritized CG may be a duplicate CG. The reference path may be an original LCH on path(s) other than the path used for CG instances 768a-h. If the triggering conditions are still valid at 766 upon expiration of the timer at 772, then the CG is deactivated autonomously. CG instances 768g and 768h are deactivated. This example can be used, for example, in cases where transmission corresponding to the original LCH has a good link quality on another path. The duplicate-CG is deprioritized to reduce the chance that duplicate packets would delay other traffics. However it is not entirely deactivated as the time period for the provision of the good link quality preserved, until the good link quality on the reference path has remained longer than the pre-defined time period. The pre-defined time period can be defined by the timer.

The at least one triggering criterion discussed above, and how the duplicate-CGs should react according to a predetermined action when the at least one triggering criteria are met can be pre-configured for a UE by a gNB. This pre-configuration may be sent via, for example, RRC. In examples, values and/or types of parameters associating to CGs can be pre-configured for a UE by a gNB. The values and/or types of parameters associating to CGs may be sent via, for example, RRC.

Figure 8:
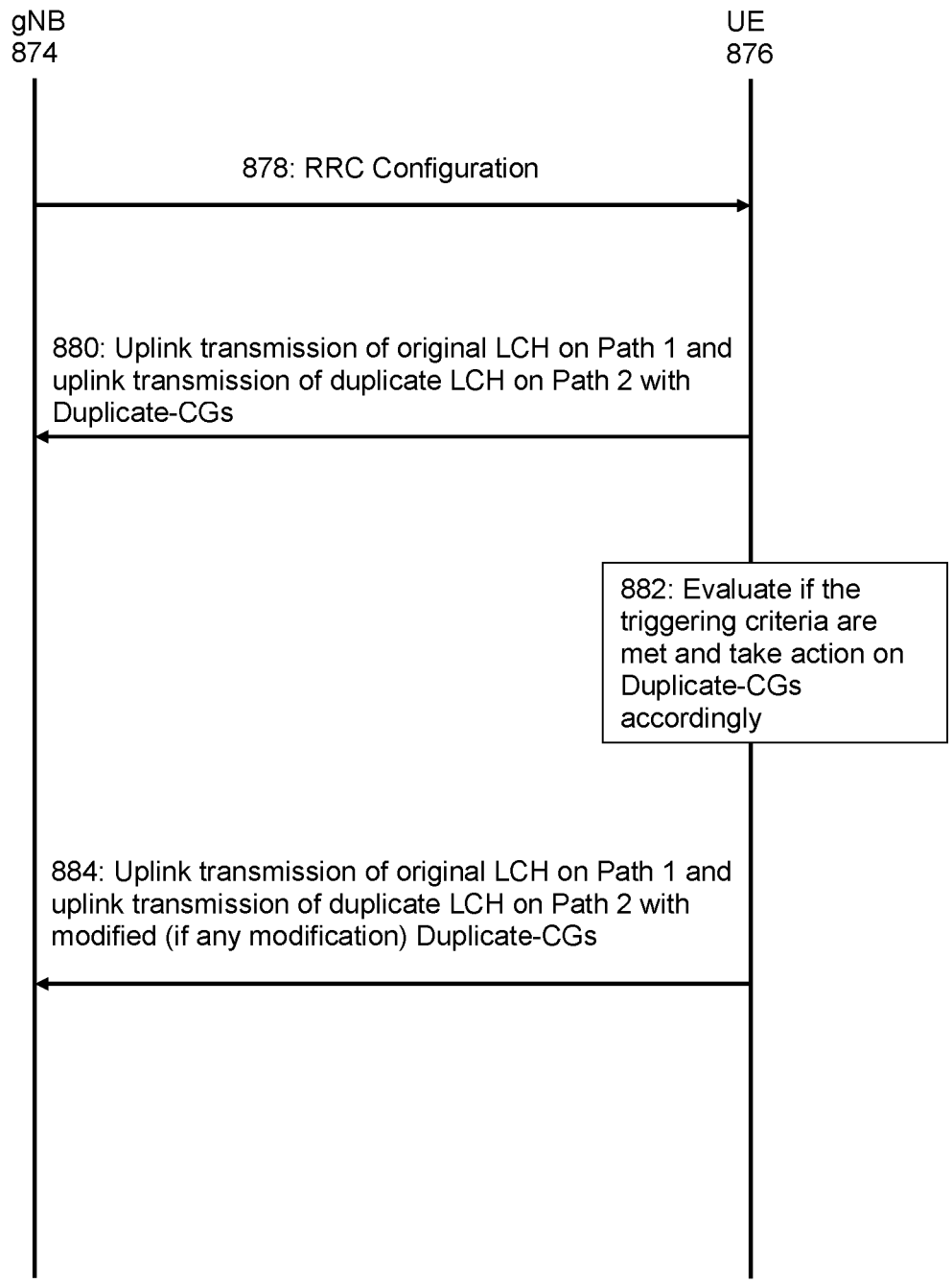
FIG. 8 schematically shows a signalling diagram of a method according to an example.

An example method flow diagram is shown in FIG. 8.

At 878, gNB 874 sends an RRC configuration to UE 876. The RRC configuration may restrict an original-LCH mapping to a first path, path 1. The RRC configuration may configure duplicate-CGs on a second path, path 2. The RRC configuration may configure at least one triggering criterion. The RRC configuration may configure actions that a UE should take for duplicate-CGs when at least one triggering criterion is determined to be met.

At 880, UE 876 undertakes uplink transmission of an original LCH on Path 1. UE 878 also undertakes uplink transmission of a duplicate LCH (a duplicate LCH of the original LCH) on Path 2. The duplicate LCH uplink transmission uses duplicate CGs.

At 882, UE 876 evaluates whether an event has taken place. This may comprise determining that the configured at least one triggering criterion is met. This may comprise determining that a control message has been received from gNB 874. This evaluation step may occur continuously or may take place at time intervals. If the triggering criteria are met, the UE will modify the duplicate-CGs accordingly. Each triggering criteria may have a corresponding modification for the duplicate CGs. The modification and triggering criteria may be one of the modifications and triggering criteria discussed in relation to the above examples. A control message may define a modification for the duplicate CGs.

At 884, uplink transmission of the original LCH on Path 1 continues. Uplink transmission of the duplicate LCH on Path 2 takes place with modified (if any modification) duplicate CGs.

Some of the examples described above provide a framework for a UE to perform:

Autonomous activation/deactivation of these CGs, based on duplication activation/deactivation MAC CEs received from a base station.

Autonomous activation/deactivation of CGs based on status/performance of the counterpart LCHs in another path(s).

Autonomously prioritize/deprioritize transmission using duplicate CGs in cases of resource collision with other grants, based on status/performance of the counterpart LCHs (reference LCHs) in another path(s).

Autonomous re-configuration of duplicate CGs in cases of resource collision with other grants, based on status/performance of the counterpart LCHs (reference LCHs) in another path(s).

Autonomous re-configuration of duplicate CGs, based on duplication activation/deactivation MAC CEs.

Autonomous prioritization/deprioritization of transmission using duplicate CGs and start a timer, based on status/performance of the counterpart LCHs in another path. Upon timer expiration, if the triggering conditions are still valid, the duplicate CGs may be deactivated entirely.

Some examples provide greater PDCP duplication efficiency by preventing transmission of a counterpart (duplicate) packet on a duplicate path when a packet is received by a gNB on a different path.

Some examples provide greater PDCP duplication efficiency by preventing transmission of a counterpart (duplicate) packet on a duplicate component carrier when a packet is received by a gNB on a different component carrier.

In some examples, a path may comprise a serving cell. Different paths may comprise different serving cells.

In some examples, a path may comprise a carrier. Different carriers may comprise different carriers.

It should be noted that URLLC traffics are typically assigned with high priority. Some examples prevent the unnecessary transmission of duplicate URLLC traffic which could may interrupt/delay other traffics when the resource of the corresponding grant overlap with other configured/dynamic grants, even if its counterpart may have already been (or very likely to be) successfully received on another path (e.g. another component carrier or another serving cell).

Figure 9:
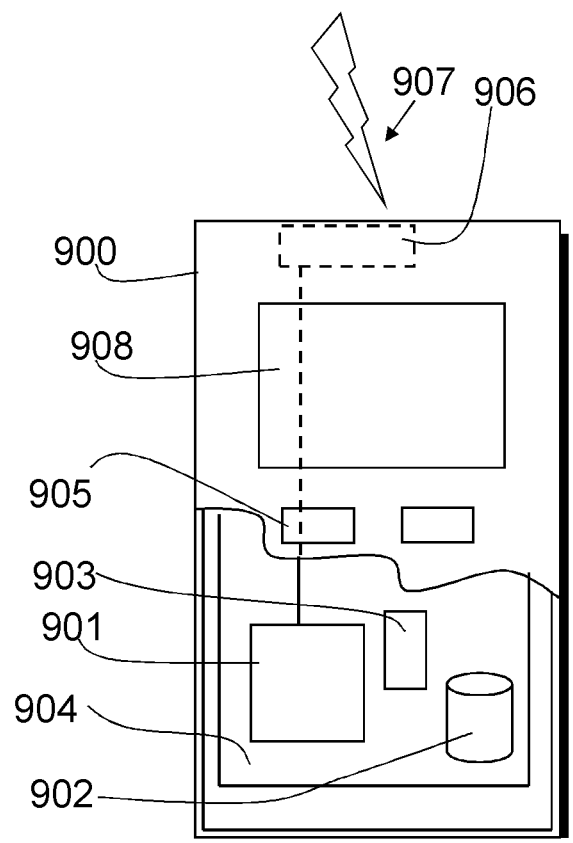
FIG. 9 schematically shows parts of a user equipment, according to an example.

A possible wireless communication device will now be described in more detail with reference to FIG. 9 showing a schematic, partially sectioned view of a communication device 900. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 900 may receive signals over an air or radio interface 907 via appropriate apparatus for receiving and may transmit signals via appropriate apparatus for transmitting radio signals. In FIG. 9 transceiver apparatus is designated schematically by block 906. The transceiver apparatus 906 may be provided for example by means of a radio part and associated antenna arrangement. The antenna arrangement may be arranged internally or externally to the wireless device.

A wireless device is typically provided with at least one data processing entity 901, at least one memory 902 and other possible components 903 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 904. The user may control the operation of the wireless device by means of a suitable user interface such as key pad 905, voice commands, touch sensitive screen or pad, combinations thereof or the like. A display 908, a speaker and a microphone can be also provided. Furthermore, a wireless communication device may comprise appropriate connectors (either wired or wireless) to other devices and/or for connecting external accessories, for example hands-free equipment, thereto. The communication devices 902, 904, 905 may access the communication system based on various access techniques.

Figure 10:
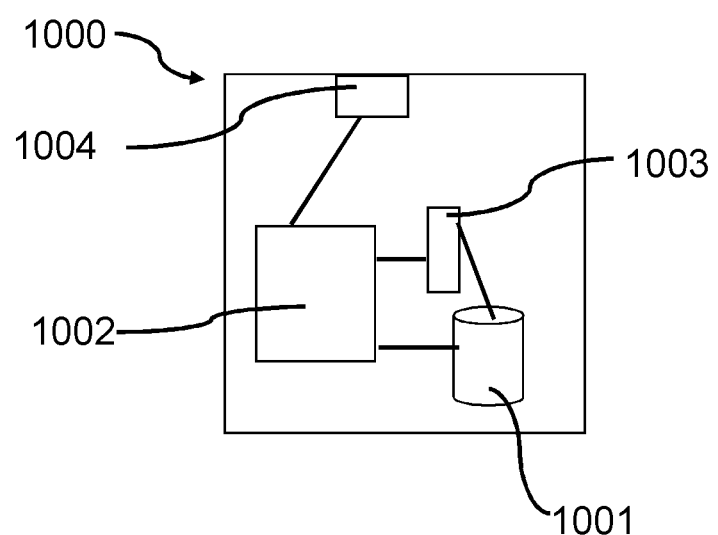
FIG. 10 schematically shows parts of an apparatus, according to an example.

FIG. 10 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, or an IAB or relay node. The control apparatus may be integrated with or external to a node or module of a core network or RAN. In some example embodiments, base stations comprise a separate control apparatus unit or module. In other example embodiments, the control apparatus can be another network element such as a radio network controller or a spectrum controller. In some example embodiments, each base station may have such a control apparatus as well as a control apparatus being provided in a radio network controller. The control apparatus 1000 can be arranged to provide control on communications in the service area of the system. The control apparatus 1000 comprises at least one memory 1001, at least one data processing unit 1002, 1003 and an input/output interface 1004. Via the interface the control apparatus can be coupled to a receiver and a transmitter of the base station. The receiver and/or the transmitter may be implemented as a radio front end or a remote radio head. For example the control apparatus 1000 or processor 1001 can be configured to execute an appropriate software code to provide the control functions.

Figure 11:
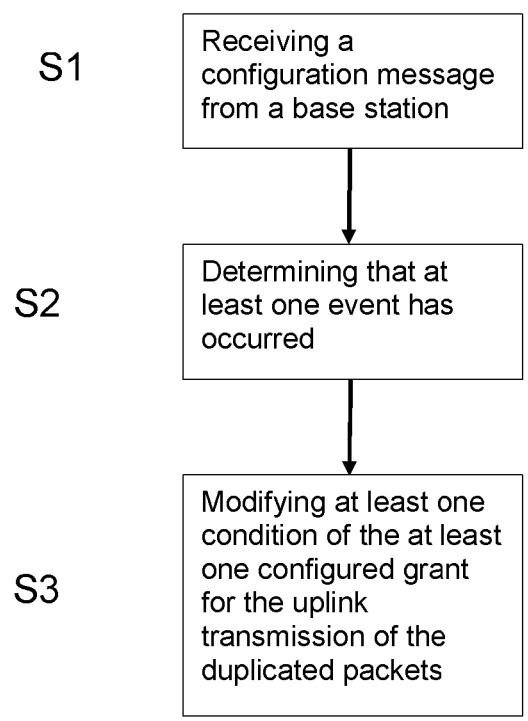
FIG. 11 shows a flow chart of an example method.

FIG. 11 is a flow chart of a method according to an example. The flow chart of FIG. 11 is viewed from the perspective of an apparatus such as UE 876.

At S1, the apparatus receives a configuration message. In examples, the configuration message comprises instructions to use at least one first path for uplink transmission of a first group of data packets. The configuration message may comprise instructions to use at least one configured grant in at least one second path for uplink transmission of duplicate packets of the first group of data packets.

At S2, the apparatus determines that at least one event has occurred.

When the apparatus determines that at least one event has occurred at S2, the apparatus modifies at least one condition of the at least one configured grant for the uplink transmission of the duplicated packets at S3.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out example embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further exemplary embodiments comprising a combination of one or more exemplary embodiments with any of the other exemplary embodiments previously discussed.

What is claimed is:

1. An apparatus comprising:
   circuitry configured for receiving a configuration message from a base station, wherein the configuration message comprises instructions to use at least one first path for uplink transmission of a first group of data packets, and to use at least one configured grant in at least one second path for uplink transmission of duplicate packets of the first group of data packets; and
   circuitry configured for, in response to determining that at least one event has occurred, modifying at least one condition of the at least one configured grant for the uplink transmission of the duplicated packets,
   wherein the circuitry configured for modifying at least one condition comprises circuitry configured for prioritizing transmission using the at least one configured grant over other uplink grants that have an overlapping radio resource with the transmission using the at least one configured grant, or for assigning a low priority to transmission using the at least one configured grant over other uplink grants that have an overlapping radio resource with the transmission using the at least one configured grant.

2. An apparatus according to claim 1, wherein the at least one event comprises receipt of a control message from the base station, and wherein the control message comprises a medium access control element, and wherein the control message comprises a packet data convergence protocol duplication activation control message or a packet data convergence protocol duplication deactivation control message.

3. An apparatus according to claim 1, comprising circuitry configured for determining that the at least one event has occurred by determining that at least one triggering criterion has been met using status information from the at least one first path.

4. An apparatus according to claim 1, comprising circuitry configured for determining that the at least one event has occurred by determining that at least one triggering criterion has been met using status information from the at least one second path.

5. An apparatus according to claim 3, wherein the at least one triggering criterion comprises at least one of:
   a determination of a channel status;
   a determination of a transmission status;
   a determination that a transmission configuration is being used; or
   a determination of a data transmission performance.

6. An apparatus according to claim 1, wherein the modifying at least one condition comprises at least one of:
   deactivating the at least one configured grant for uplink transmission of duplicate packets of the first group of data packets; or
   activating the at least one configured grant for uplink transmission of duplicate packets of the first group of data packets.

7. An apparatus according to claim 1, wherein the circuitry configured for modifying at least one condition comprises:
   circuitry configured for changing at least one parameter of the uplink transmission of the duplicated packets,
   wherein the at least one parameter of the uplink transmission of the duplicated packets comprises at least one of:
   a modulation and coding scheme;
   a transport block size;
   resource size/timing;
   transmission power; a number of repetitions; or
   flag of enabling frequency hopping.

8. An apparatus according to claim 3, comprising:
   circuitry configured for starting a timer when the at least one triggering criterion is met;
   circuitry configured for determining if the at least one triggering criterion is met upon expiry of the timer; and
   circuitry configured for modifying at least one further condition for the uplink transmission of the duplicated packets when the at least one triggering criterion is still determined to be met upon expiry of the timer.

9. A method comprising:
   receiving a configuration message from a base station, wherein the configuration message comprises instructions to use at least one first path for uplink transmission of a first group of data packets, and to use at least one configured grant in at least one second path for uplink transmission of duplicate packets of the first group of data packets; and in response to determining that at least one event has occurred, modifying at least one condition of the at least one configured grant for the uplink transmission of the duplicated packets, wherein the method comprises:

determining that the at least one event has occurred by determining that at least one triggering criterion has been met using status information from the at least one first path, wherein the method comprises: determining that the at least one event has occurred by determining that at least one triggering criterion has been met using status information from the at least one second path, and wherein the at least one triggering criterion comprises at least one of: a determination of a channel status; a determination of a transmission status; a determination that a transmission configuration is being used; a determination of a data transmission performance, and starting a timer when the at least one triggering criterion is met; determining if the at least one triggering criterion is met upon expiry of the timer; and modifying at least one further condition for the uplink transmission of the duplicated packets when the at least one triggering criterion is still determined to be met upon expiry of the timer.

10. A method according to claim 9, wherein the at least one event comprises receipt of a control message from the base station, wherein the control message comprises a medium access control element, and wherein the control message comprises a packet data convergence protocol duplication activation control message or a packet data convergence protocol duplication deactivation control message.

11. A method according to claim 9, wherein the modifying at least one condition comprises at least one of: deactivating the at least one configured grant for uplink transmission of duplicate packets of the first group of data packets; and activating the at least one configured grant for uplink transmission of duplicate packets of the first group of data packets, wherein the modifying at least one condition comprises prioritizing transmission using the at least one configured grant over other uplink grants that have an overlapping radio resource with the transmission using the at least one configured grant, or assigning a low priority to transmission using the at least one configured grant over other uplink grants that have an overlapping radio resource with the transmission using the at least one configured grant, and wherein the modifying at least one condition comprises: changing at least one parameter of the uplink transmission of the duplicated packets, wherein the at least one parameter of the uplink transmission of the duplicated packets comprises at least one of: a modulation and coding scheme; a transport block size; resource size/timing; transmission power; a number of repetitions; flag of enabling frequency hopping.

12. A non-transitory program storage device readable by a machine, tangibly embodying a program of instructions executable by the machine for performing operations, the operations comprising the method as claimed in claim 9.

* * * * *